3,286,604
MARKING MATERIALS
Eduard R. de Vries, Huntingdon, Pa., assignor to Prismo Safety Corporation, Huntingdon, Pa., a corporation of Pennsylvania
No Drawing. Filed Aug. 16, 1962, Ser. No. 217,278
15 Claims. (Cl. 94—22)

The present invention relates to marking materials and more particularly to metal coated glass beads, the method of making them and markers including such beads.

It has heretofore been proposed to utilize metal coated or so called silvered glass beads in reflective marking. These metal coated glass beads are made in various ways and have a tightly adhering metal coating that is not easily removed. When such silvered beads are used in signs or other reflective markings, the silvered beads are partially embedded in a binder. After the binder has solidified, the metal coating on the exposed surfaces of the beads can be removed by acid treatment or by abrasion.

It is an object of the present invention to provide novel metal coated glass beads wherein the metal coating is not very adherent to the glass bead so that it may be readily and easily removed.

Another object of the present invention is to provide a method of making metal coated glass beads wherein the metal coating is not very adherent to the glass bead.

A still further object of the present invention is to provide a reflective marker utilizing these novel metal coated beads.

Other objects and the nature and advantages of the instant invention will be apparent from the following description.

According to the present invention, glass beads of a size which are customarily used in highway and sign markers are wetted by a relatively volatile liquid. Finely divided leafing metal powder is then added and the mixture is agitated until the metal powder adheres evenly to the wetted surfaces of the glass beads and free flowing coated beads are formed.

These coated beads may be expelled from a spray gun or dispenser in the usual manner onto a wet paint coatings such as a traffic line, a sign or other reflective marker. After the paint has solidified, the metal powder remaining on the top surfaces of the beads sticking out of the paint line can be brushed off, blown off or washed off. The metal powder can be readily removed because the metal powder is held onto the glass bead only by the volatile liquid which has now evaporated. The metal powder on the back of the bead embedded in the paint layer will be bonded to the glass by the paint and will increase the light return very significantly.

The glass beads may be in the range of ½–50 mils in diameter and preferably are of a relatively high refractive index, e.g. approximately 1.92, so that maximum reflectivity is obtained from the silvered surface on the underside of the beads.

The metal powder may be any leafing powder such as aluminum, gold, silver, copper, bronze, magnesium, and the like although aluminum is preferred. The metal powder should be of a particle size which does not exceed 1/10 the diameter of the glass beads used. If the metal powder particles are too large they will not coat the tiny glass beads which are in the order of ½–50 mils in diameter.

The volatile liquid may be xylol, alcohols, methyl isobutyl ketone, chlorinated hydrocarbons, aliphatic hydrocarbons, or any other medium fast evaporating liquid. The liquid is added in an amount that is just sufficient to wet the glass beads so that the metal powder will stick evenly to the surfaces of the glass beads. The metal powder is added in slight excess so that free flowing glass beads are formed.

To obtain better bonding between the coated beads and the paint coating layer, a finely divided resin can be included in the coating of the glass beads. Thus, a dry mixture of the metal leafing powder, and the powdered resin are added to the volatile liquid wetted glass beads. The resin must be one that is insoluble in the liquid used. The glass beads after agitation are free flowing beads coated with the metal powder and resin powder held onto the glass beads only by the volatile liquid.

When these metal-resin coated beads are dropped onto a wet paint containing a solvent in which the resin is soluble, the solvent of the paint layer will penetrate the slight layer of the aluminum powder, powdered resin and solvent and will dissolve the organic resin and cause better bonding when the wet paint has solidified in the usual manner.

The aluminum powder, powdered resin and volatile liquid on the top of the bead extending out of the paint layer will fall off or can be readily blown or brushed off after evaporation of the liquid.

The resin powder used is not critical as long as it is soluble in the solvent of the paint layer and it has been found desirable in many cases to utilize the same resin in the bead coating that is used as the binder in the paint layer. Examples are methyl methacrylate resins which are soluble in ketones, esters and aromatic chlorinated hydrocarbons but which are resistant to alcohols at room temperature. Cellulose acetate, cellulose propionate, cellulose acetate butyrate and cellulose nitrate resins are soluble in ketones and esters, but are not affected by hydrocarbons. Polystyrene resins are soluble in aromatic and chlorinated hydrocarbons. Vinyl butyral resins resist aliphatic hydrocarbons but dissolve in alcohol. Vinyl chloride and vinyl chloride-acetate resins resist alcohols and aliphatic hydrocarbons but are soluble in ketones and esters. The resin powder particle size should not exceed 1/10 the diameter of the glass beads used.

Thus it is seen, that various combinations of resins, volatile liquids and solvents may be utilized so long as the resin is insoluble in the volatile liquid used for holding the resin and metal powder to the glass beads and is soluble in the solvent used in the binder layer in which the coated beads are partially embedded.

Glass beads coated in accordance with this invention can also be used in the preparation of silvered reflective spheroids as are described in co-pending application Serial No. 61,998, filed Oct. 11, 1960, entitled, "Reflective Spheroids," now abandoned, and Serial No. 322,857, filed Nov. 12, 1963, entitled "Silvered Reflective Marking Materials," now Patent No. 3,254,563. These marking materials comprise solidified cores of a thermosetting resin having a plurality of glass beads partially embedded in the outer surfaces thereof. Using the beads of the present invention, the exposed metal powder covered surfaces of the beads can be easily removed without the use of nitric acid as has previously been required with the commercial silvered glass beads.

The glass beads coated in accordance with the present invention can also be used in making the reflective granules which are described in co-pending application Serial No. 173,638, filed Feb. 16, 1962, entitled "Reflective Granules," now Patent No. 3,252,376.

After the beads have been coated in accordance with this invention they are maintained in closed containers to prevent the evaporation of the volatile liquid, thus maintaining the metal powder wet enough to adhere to the glass spheres. When the liquid has evaporated as the beads are being dispensed or sprayed, the metal powder is easily removed from the glass beads.

It will be obvious to those skilled in the art that various changes may be made without departing from the spirit of the invention and therefore the invention is not limited to what is shown and described in the specification, but only as indicated in the appended claims.

What is claimed is:

1. Free flowing glass beads having a diameter in the range of ½–50 mils which are coated with a coating of finely divided aluminum leafing powder wetted by a medium fast evaporating liquid free of resinous binder whereby after the relatively volatile liquid has evaporated the aluminum leafing powder may be readily removed from the glass beads.

2. Free flowing glass beads which are coated with a coating of finely divided metal leafing powder and powdered resin wetted by a relatively volatile liquid free of resinous binder, said resin being insoluble in said liquid, whereby after the relatively volatile liquid has evaporated the metal powder and resin may be readily removed from the glass beads.

3. Glass beads in accordance with claim 2 wherein the metal powder and resin powder particle size does not exceed 1/10 the diameter of the glass beads.

4. Glass beads in accordance with claim 2 wherein the metal powder is aluminum leafing powder and the liquid is a medium fast evaporating liquid.

5. A method of making retro-reflective markers which comprises dropping coated glass beads onto a wet binder layer, said glass beads being coated with finely divided metal leafing powder wetted by a relatively volatile liquid free of resinous binder permitting said binder layer to solidify so that the coated glass beads are partially embedded therein, and removing the powdered metal from the exposed surfaces of the beads after the relatively volatile liquid holding the metal powder thereon has evaporated.

6. A method in accordance with claim 5 wherein the metal powder particle size does not exceed 1/10 the diameter of the glass beads.

7. A method in accordance with claim 5 wherein the metal powder is aluminum leafing powder and the liquid is a medium fast evaporating liquid.

8. A method of making retro-reflective markers which comprises dropping coated glass beads onto a wet binder layer, said glass beads being coated with a mixture of finely divided metal and powdered resin wetted by a relatively volatile liquid free of resinous binder, said resin being insoluble in said relatively volatile liquid and soluble in said wet binder layer, permitting said binder layer to solidify so that the coated glass beads are partially embedded therein, and removing the powdered metal and resin from the exposed surfaces of the beads after the relatively volatile liquid holding the metal powder and resin thereon has evaporated.

9. A method in accordance with claim 8 wherein the metal powder and resin powder particle size does not exceed 1/10 the diameter of the glass beads.

10. A method in accordance with claim 8 wherein the metal powder is aluminum leafing powder and the liquid is a medium fast evaporating liquid.

11. A method of making free flowing coated glass beads which comprises agitating glass beads having diameters in the range of ½–50 mils with a relatively volatile liquid free of resinous binder with an excess of finely divided metal powder, said liquid being present in an amount sufficient to merely wet the outer surfaces of said beads, and continuing the agitation until the glass beads are evenly coated with the metal powder which is held onto the beads by the relatively volatile liquid and said beads become free flowing.

12. A method in accordance with claim 11 wherein the metal powder particle size does not exceed 1/10 the diameter of the glass beads.

13. A method in accordance with claim 11 wherein the metal powder is aluminum leafing powder and the liquid is a medium fast evaporating liquid.

14. A method of making free flowing coated glass beads which comprises agitating glass beads wetted with a relatively volatile liquid free of resinous binder with a mixture of finely divided metal powder and powdered resin until the glass beads are evenly coated with the mixture of the metal powder and powdered resin which are held onto the beads by the relatively volatile liquid, said resin being insoluble in said relatively volatile liquid.

15. A method in accordance with claim 14 wherein the powdered metal and the powdered resin particle size does not exceed 1/10 the diameter of the glass beads and the liquid is a medium fast evaporating liquid.

References Cited by the Examiner

UNITED STATES PATENTS

| 1,569,484 | 1/1926 | Hall | 106—290 |
|---|---|---|---|
| 1,986,591 | 1/1935 | Meyer | 94—1.5 |
| 2,002,891 | 5/1935 | Hall | 106—290 |
| 2,347,233 | 4/1944 | Abernathy | 94—1.5 X |
| 2,574,971 | 11/1951 | Heltzer | 94—1.5 X |
| 2,591,245 | 4/1952 | Edwards | 106—290 |
| 2,592,883 | 4/1952 | Fischer et al. | 94—1.5 |
| 2,695,275 | 11/1954 | Gray | 106—193 |
| 2,875,087 | 2/1959 | Crandon | 117—160 X |
| 2,904,523 | 9/1959 | Hawkins | 106—290 X |
| 2,963,378 | 12/1960 | Palmquist | 94—1.5 |
| 3,013,892 | 12/1961 | Songas | 117—31 X |
| 3,014,409 | 12/1961 | Palmquist | 117—160 |

FOREIGN PATENTS 104,564    1938    Australia.

OTHER REFERENCES

Metal Finishing, April 1958, vol. 56, No. 4, pages 52 and 53.

CHARLES E. O'CONNELL, *Primary Examiner.*

JACOB L. NACKENOFF, *Examiner.*

FRANK L. ABBOTT, J. E. MURTAGH,
*Assistant Examiners.*